(12) United States Patent
Oh et al.

(10) Patent No.: US 8,576,551 B2
(45) Date of Patent: Nov. 5, 2013

(54) IMAGE DISPLAY DEVICE

(75) Inventors: Guen-Taek Oh, Busan (KR); Han-Yung Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/883,937

(22) Filed: Sep. 16, 2010

(65) Prior Publication Data

US 2011/0096486 A1 Apr. 28, 2011

(30) Foreign Application Priority Data

Sep. 18, 2009 (KR) .................. 10-2009-0088710

(51) Int. Cl.
*G06F 1/16* (2006.01)
*H05K 5/00* (2006.01)
*H05K 7/00* (2006.01)

(52) U.S. Cl.
USPC ............... 361/679.21; 361/679.22; 349/58

(58) Field of Classification Search
USPC ............... 361/679.21–679.23; 349/58–60; 313/582
See application file for complete search history.

(56) References Cited

U.S. PATENT DOCUMENTS

| | | | | |
|---|---|---|---|---|
| 5,587,557 A * | 12/1996 | Kurihara et al. | ............... | 174/266 |
| 5,877,827 A * | 3/1999 | Lee | ................. | 349/43 |
| 5,948,092 A * | 9/1999 | Crump et al. | ................. | 710/300 |
| 6,268,998 B1 * | 7/2001 | Cho | ........................ | 361/679.23 |
| 6,819,550 B2 * | 11/2004 | Jobs et al. | ................. | 361/679.22 |
| 7,140,034 B2 * | 11/2006 | Kamei et al. | .................... | 725/153 |
| 7,487,729 B2 * | 2/2009 | Riddiford et al. | .......... | 108/50.01 |
| 7,545,627 B1 * | 6/2009 | Lantigua | ................. | 361/679.04 |
| 2001/0022719 A1 * | 9/2001 | Armitage et al. | ............. | 361/681 |
| 2003/0021086 A1 * | 1/2003 | Landry et al. | ................. | 361/683 |
| 2003/0086240 A1 * | 5/2003 | Jobs et al. | ...................... | 361/683 |
| 2004/0150943 A1 * | 8/2004 | Rock | ............................. | 361/681 |
| 2006/0152898 A1 * | 7/2006 | Hirayama | ..................... | 361/683 |
| 2007/0097609 A1 * | 5/2007 | Moscovitch | .................. | 361/681 |
| 2007/0157856 A1 * | 7/2007 | Skoog et al. | .................... | 108/70 |
| 2008/0024422 A1 * | 1/2008 | Kim et al. | ...................... | 345/102 |
| 2008/0284676 A1 * | 11/2008 | Moscovitch | .................. | 345/1.3 |
| 2009/0079665 A1 * | 3/2009 | Moscovitch | .................. | 345/1.3 |

FOREIGN PATENT DOCUMENTS

| CN | 2426168 Y | 4/2001 |
|---|---|---|
| CN | 101079213 A | 11/2007 |

OTHER PUBLICATIONS

Office Action issued in corresponding Chinese Patent Application No. 201010287702.4, mailed Aug. 31, 2012.

* cited by examiner

*Primary Examiner* — Adrian S Wilson
(74) *Attorney, Agent, or Firm* — Brinks Hofer Gilson & Lione

(57) ABSTRACT

Disclosed herein is an image display device including a liquid crystal panel module for implementing an image; an image display device cover to which the liquid crystal panel module is mounted and fastened; an image display device pedestal base combined with the image display device cover to support the image display device; and a system board mounted within the image display device pedestal base.

6 Claims, 3 Drawing Sheets

IMAGE DISPLAY DEVICE

This application claims the benefit of Korea Patent Application No. 10-2009-0088710, filed on Sep. 18, 2009, the entire contents of which is incorporated herein by reference for all purposes as if fully set forth herein.

BACKGROUND

1. Field of the Invention

The present disclosure relates to a display device, and more particularly, to an image display device in which part of a system circuit unit is incorporated into a pedestal base portion of the Image display device to realize a slim structure.

2. Discussion of the Related Art

In general, a flat panel display (FPD) is a display device essentially used to implement a small-sized and light-weight system, such as a portable computer including notebook computer, personal digital assistant (PDA) and the like, a portable phone terminal, or the like, as well as a display monitor of a desktop computer.

Such a flat panel display may include a liquid crystal display (LCD), a plasma display panel (PDP), a field emission display (FED), and the like. In particular, the liquid crystal display (LCD) is primarily used as a display device for a display monitor of a mobile phone or computer, a television set, or the like, because it has excellent visibility, less average power consumption as well as less thermal dissipation, compared to the same-sized cathode ray tube (CRT).

A liquid crystal display, as a display device for a display monitor of a mobile phone or computer, a television set, or the like, is an image display device in which the material of liquid crystal in an intermediate state between liquid and solid is injected between two glass substrates, thereby using the transmittance of the liquid crystal changed depending on a voltage applied from the outside.

Particularly, there is an increasing demand for display monitors to which such a liquid crystal display is applied because they are slimmer and lighter weight, and have less power consumption and eye fatigue, compared to conventional CRT monitors using a cathode ray tube (CRT).

Hereinafter, the structure of such a typical image display device will be described with reference to FIGS. 1 and 2.

FIG. 1 is an exploded perspective view illustrating an image display device in the related art.

FIG. 2 is a side view illustrating an assembled state of an image display device in the related art.

As illustrated in FIG. 1, an image display device 10 in the related art may be configured by including a housing 20 in which a liquid crystal panel module 12 is mounted, a front cover 14 detachably provided on a front surface of the housing 20, an image display device cover 22 to which the housing 20 mounted with the liquid crystal panel module 12 is inserted and fastened, and a device pedestal base 30 fastened to the image display device cover 22 to fix and support the image display device 10.

Here, the inside of the housing 20 has an area capable of inserting the liquid crystal panel module 12, and a receiving portion 20a capable of receiving a power board 16, a signal board 18, and the like is formed therewithin to protrude to the outside to drive the liquid crystal panel module 12.

Also, the inside of the image display device cover 22 to which the housing 20 is inserted has an area capable of inserting the housing 20, and an accommodation portion 22a capable of accommodating the receiving portion 20a for receiving the power board 16, signal board 18, and the like, connected to drive the liquid crystal panel module 12, is formed therewithin to protrude to the outside.

Furthermore, a lower surface of the image display device cover 22 is formed with screw holes (not shown) to be combined and fastened to the image display device pedestal base 30.

On the other hand, the image display device pedestal base 30 may include a vertical supporting stand 24 and a lower supporting stand 26. At this time, the vertical supporting stand 24 is combined with screw holes (not shown) provided in the image display device cover 22 through fastening members, thereby allowing the image display device 10 to be controlled in a vertical direction by a predetermined angle. In addition, the lower supporting stand 26 maintains the image display device 10 to be stably fixed and supported on a table (not shown).

However, an image display device according to related art has the following problems.

According to an image display device according to the related art, a receiving portion for receiving a power board, a signal board, and the like, connected to drive a liquid crystal panel, is formed within the housing to protrude to the outside, and thus a ratio of the thickness (T1) of the image display device to the thickness of the liquid crystal panel is increased 4-5 times. As a result, even though the liquid crystal panel modules is made slim, there is limit in making direct effect on the slimness of the image display device.

In particular, in a liquid crystal monitor of the related art, a circuit board for driving an liquid crystal panel, for example, a power board, a signal board, and the like, is mounted on a rear surface of the liquid crystal panel, thereby increasing an overall thickness of the image display device due to a receiving portion formed to be protruded within the housing thereof to mount the circuit board.

BRIEF SUMMARY

A display monitor includes a liquid crystal panel module for implementing an image; an image display device cover to which the liquid crystal panel module is mounted and fastened; a monitor pedestal base combined with the image display device cover to support the image display device; and a system board mounted within the image display device pedestal base.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Hereinafter, the structure of an image display device according to the present invention will be described in detail with reference to FIGS. 3 through 6.

Figure 1:
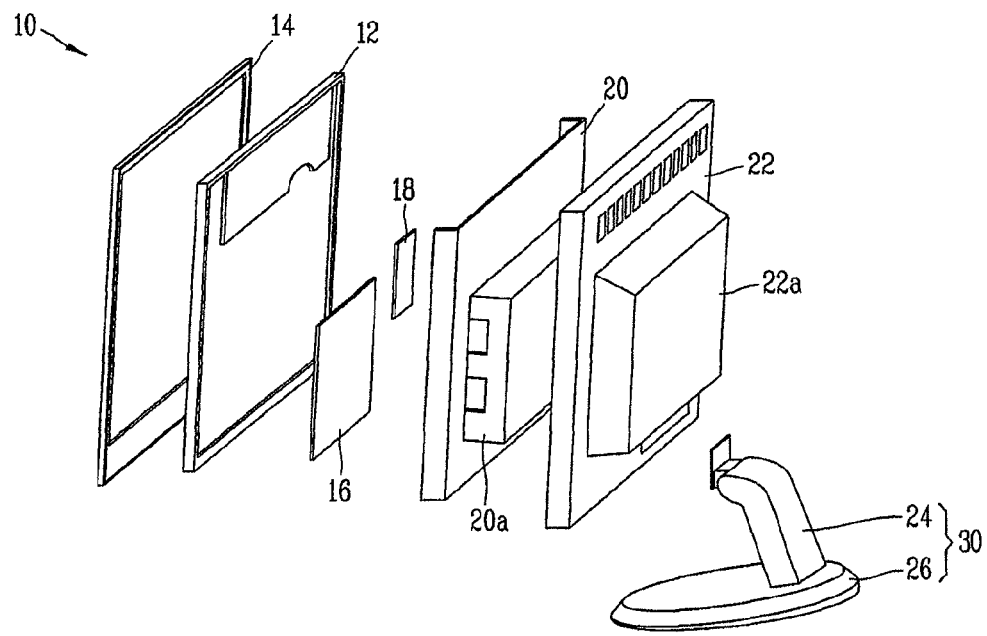
FIG. 1 is an exploded perspective view illustrating an image display device in the related art.
Figure 2:
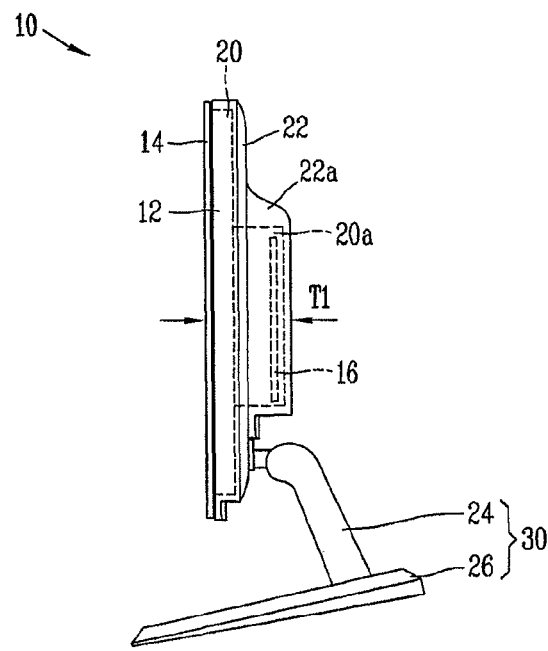
FIG. 2 is a side view illustrating an assembled state of an image display device in the related art.
Figure 3:
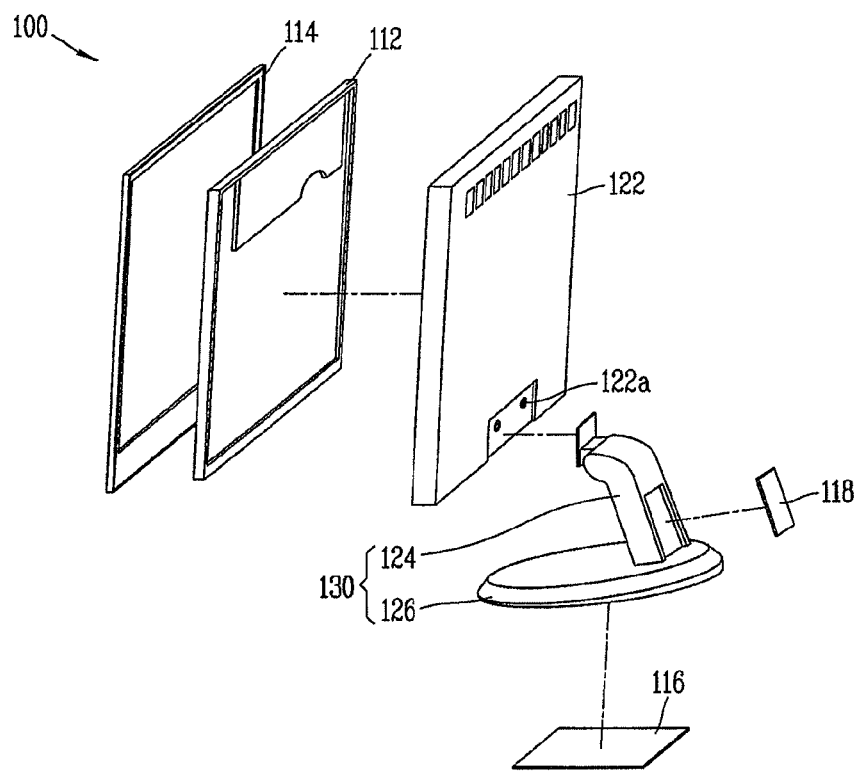
FIG. 3 is an exploded perspective view illustrating an image display device according to an embodiment of the present invention.

FIG. 3 is an exploded perspective view illustrating an image display device according to an embodiment of the present invention.

Figure 4:
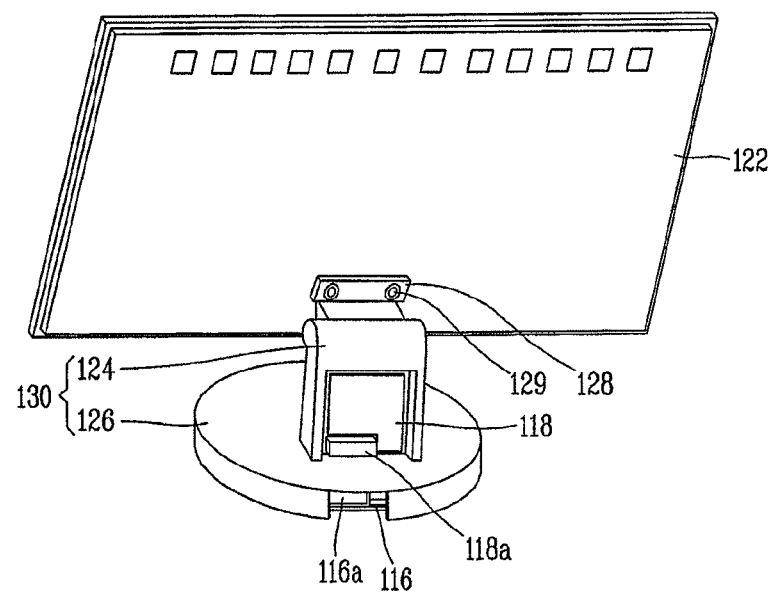
FIG. 4 is a rear perspective view of an image display device according to the present invention, illustrating a state that a signal board of a system board thereof is mounted within a vertical supporting stand of the image display device pedestal base.

FIG. 4 is a rear perspective view of an image display device according to the present invention, illustrating a state that a signal board of a system board thereof is mounted within a vertical supporting stand of the image display device pedestal base.

Figure 5:
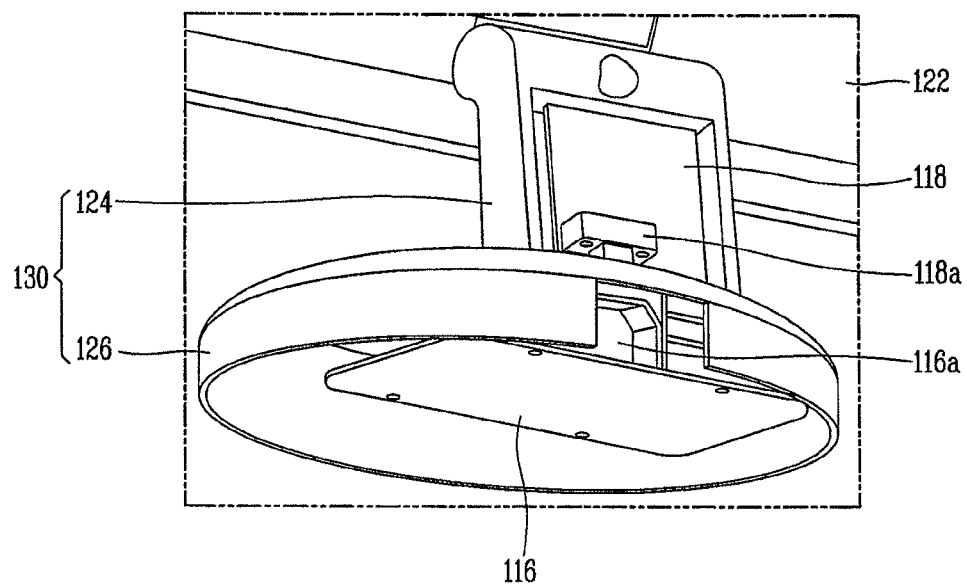
FIG. 5 is a view illustrating a state that a power board is mounted within a lower supporting stand of the image display device pedestal base in a display monitor according to an embodiment of the present invention.

FIG. 5 is a view illustrating a state that a power board is mounted within a lower supporting stand of the image display device pedestal base in an image display device according to an embodiment of the present invention.

Figure 6:
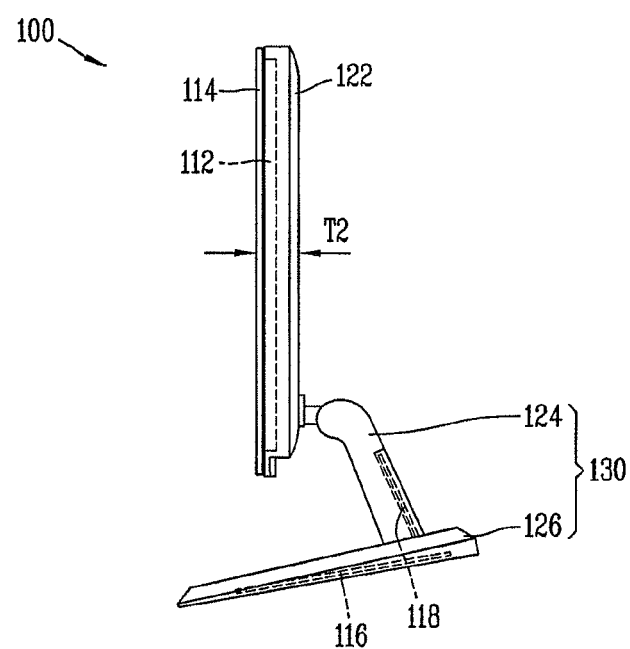
FIG. 6 is a side view illustrating an assembled state of an image display device according to an embodiment of the present invention.

FIG. 6 is a side view illustrating an assembled state of an image display device according to an embodiment of the present invention.

As illustrated in FIGS. 3 through 5, an image display device 100 according to the an embodiment of present invention may be configured by including a liquid crystal panel module 112 for implementing an image, an image display device cover 122 to which the liquid crystal panel module 112 is mounted and fastened, a front cover 114 detachably provided at a front surface of the image display device cover 122, and an image display device pedestal base 130 fastened to the image display device cover 122 to fix and support the image display device 110.

Here, a size of the inside of the image display device cover 122 has an area capable of inserting the liquid crystal panel module 112.

Furthermore, fastening holes 122a are formed to be combined with the image display device pedestal base 130. However, according to the kind of combining members instead of the fastening holes, other types of assembly structures may be also applicable thereto.

On the other hand, the image display device pedestal base 130 may include a vertical supporting stand 124 and a lower supporting stand 126.

At this time, the vertical supporting stand 124 is assembled or combined with fastening holes 122a by fastening screws 129, rotatable hinge members, other folding-type fastening members, or the like, thereby allowing the image display device 100 to be adjusted by a predetermined angle in a vertical or horizontal direction. Furthermore, the lower supporting stand 126 maintains the image display device 100 to be stably fixed and supported on a table (not shown).

Here, as illustrated in FIGS. 4 and 5, a power board 116 having a larger volume in a system board is built within a lower portion of the lower supporting stand 126 of the image display device pedestal base 130, and a signal board 118 having a relatively small volume than that of the power board 116 is built within the vertical supporting stand 124.

At this time, a power cord unit 116a is provided at a lateral surface of the lower supporting stand 126 built with the power board 116, and a cable connector unit 118a is provided at a side of the vertical supporting stand 124 built with the signal board 118 to be connected to another driving cable.

On the other hand, the signal board 118 should not be necessarily built in the vertical supporting stand 124, and may be built in the lower supporting stand 126 to be used. Similarly, the power board 116 should not be necessarily built in the lower supporting stand 126, and may be also built in the vertical supporting stand 124 to be used. Moreover, the power board 116 and signal board 118 may be incorporated together within the vertical supporting stand 124 and lower supporting stand 126, respectively.

On the other hand, though not shown in the drawing, the structure of a liquid crystal panel module 112 according to the present invention will be briefly described as follows.

The liquid crystal panel module 112 according to the present invention, though not shown in the drawing, includes a liquid crystal panel and an LED backlight folded with each other in the top and bottom, and a cover bottom (not shown) for covering a rear surface of the LED backlight in a shape that a rectangular support main surrounds the edges thereof and a top cover surrounding the front edges of the liquid crystal panel are combined and integrated by means of the support main.

In addition, the liquid crystal panel is comprised of a first and a second substrate by interposing a liquid crystal layer (not shown) therebetween, and the LED backlight may include a reflection sheet interposed as an inner surface of the cover bottom, a light guide plate placed at an upper portion thereof, and a plurality of optical sheets inserted between the light guide plate and the liquid crystal panel.

Here, the LED backlight may include a plurality of LED light sources mounted on a printed circuit board (PCB) along a lateral surface of the light guide plate.

At this time, the LED light source may include a plurality of spontaneously emitting LEDs (light-emitted diodes). Here, a plurality of LEDs are used for the LED light source. However, CCFL or other light sources may be used, if required.

Subsequently, a diffusion sheet and an optical sheet constituting an optical sheet are laminated on the light guide plate. At this time, the optical sheet may include a plurality of prism sheets for refocusing the luminance of light passing through the diffusion sheet to increase the luminance of the light.

Here, the diffusion sheet diffuses light beams entered to the light guide plate, thereby preventing the phenomenon of densely populated light beams.

Next, a liquid crystal panel is placed and disposed on the optical sheet and adhered to an optical-shielding tape to be supported by a mounting portion of the support main. At this time, though not shown in the drawing, a first substrate which is a thin-film transistor array substrate and a second substrate which is a color filter substrate are combined with each other to maintain a predetermined gap, and liquid crystals are interposed between the two substrates to form a liquid crystal layer, and polarizing plates are adhered to the outside of the two substrates, respectively.

Here, though not shown in the drawing, a plurality of gate lines and a plurality of data lines are intersected with each other to be disposed on the first substrate which is a thin-film transistor array substrate.

Furthermore, a gate driving circuit unit and a data driving circuit unit are formed to connect the plurality of gate lines with the plurality of data lines respectively. A thin-film transistor provided one-by-one for each pixel is formed at a region where the plurality of gate lines and data lines are intersected with each other, thereby defining a pixel at a region formed by intersecting the plurality of gate lines and the plurality of data lines with each other.

In addition, though not shown in the drawing, a color filter layer including red, green, and blue is formed at a position corresponding to pixels on the second substrate which is a color filter substrate, and a black matrix is formed between the color filter layers, thereby preventing light from being leaked between the color filter layers as well as preventing the color interference of light passing through the pixel.

On the other hand, a pixel electrode and a common electrode are formed at an inner surface faced by the first substrate which is a thin-film transistor array substrate and the second substrate which is a color filter substrate to apply an electric field to the liquid crystal layer. At this time, the pixel electrode is formed for each pixel on the thin-film transistor array substrate while a common electrode is formed to be incorporated into an entire surface of the color filter substrate.

However, the common electrode should not be necessarily formed on a color filter substrate, but may be also formed on a thin-film transistor array substrate according to the driving mode of the liquid crystal display.

Accordingly, an alignment of liquid crystal molecules in the liquid crystal layer is changed by controlling a voltage applied to the pixel electrode in a state that a voltage is applied to the common electrode, thereby individually adjusting the optical transmittance of the pixels.

Light emitted from each of the LED light sources in the liquid crystal panel module 112 with the foregoing configuration is entered to a lateral surface of the light guide plate and refracted toward the liquid crystal panel therein, and processed into a high-definition surface light having a more uniform distribution and supplied to the liquid crystal panel.

As illustrated in FIG. 6, in an image display device 100 according to the present invention, a power board 116 and a signal board 118 constituting a system board is incorporated into a lower supporting stand 126 and a vertical supporting stand 124 of the image display device pedestal base 130, respectively, thereby realizing a slim structure of the overall thickness (T2).

As described above, in an image display device according to the present invention, a housing is removed, and a system board is mounted in a vacant space of the image display device pedestal base, thereby slimming an overall thickness of the image display device as well as reducing the production cost of the image display device.

On the other hand, in addition to the liquid crystal display, an image display device according to the present invention may be also applicable to other types of image display devices using a plasma display panel (PDP), a field emission display (FED), and the like. The image display device includes a display monitor using a liquid crystal display (LCD), an organic light emitting diode device, a plasma display panel (PDP), or a field emission display (FED).

Although preferred embodiments of the present invention have been described above, it should be understood by those skilled in the art that various modifications and equivalent other embodiments of the present invention can be made.

Accordingly, the scope of the present invention is not limited to the above embodiments, and various modifications and improvements will become apparent to those skilled in the art without departing from the scope of the present invention as defined in the following claims.

The invention claimed is:

1. An image display device, comprising:
a liquid crystal panel module;
an image display device cover to which the liquid crystal panel module is mounted and fastened;
an image display device pedestal base combined with the image display device cover to support the image display device, wherein the image display device pedestal base comprises a vertical supporting stand and a lower supporting stand;
a system board mounted within the image display device pedestal base and including a power board and a signal board, wherein the signal board comprises drivers which drive a plurality of gate lines and a plurality of data lines within the liquid crystal panel module;
a power cord unit provided inside of a lateral surface of the lower supporting stand built with the power board, wherein the power cord unit is not exposed outside the lateral surface of the lower supporting stand; and
a cable connector unit provided at a side of the vertical supporting stand built with the signal board to be connected to another driving cable,
wherein the signal board is disposed within the vertical supporting stand, and the power board is built within the lower supporting stand.

2. The image display device of claim 1, further comprising:
a front cover detachably provided at a front surface of the image display device cover.

3. The image display device of claim 1, wherein the image display device includes a display monitor using a liquid crystal display.

4. The image display device of claim 1, wherein the image display device includes a display monitor using an organic light emitting diode device.

5. The image display device of claim 1, wherein the image display device includes a plasma display device.

6. The image display device of claim 1, wherein the image display device includes a field emission display.

* * * * *